Oct. 22, 1963     A. G. MAKOWSKI     3,107,829
DISPENSER FOR CONTAINERS
Filed Dec. 13, 1960
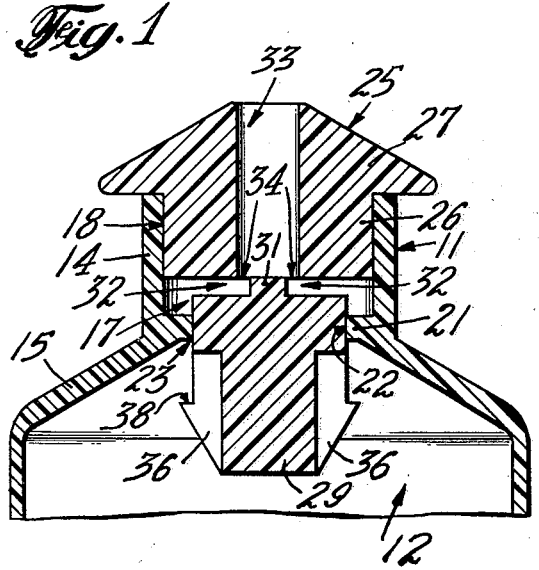
Fig. 1
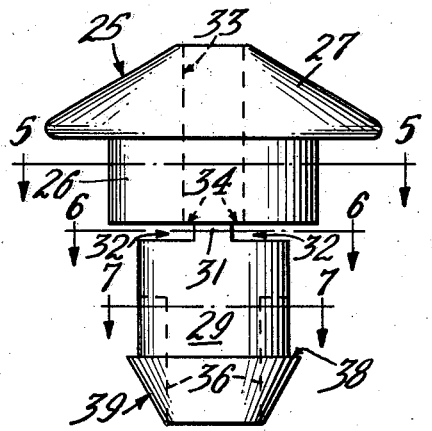
Fig. 3
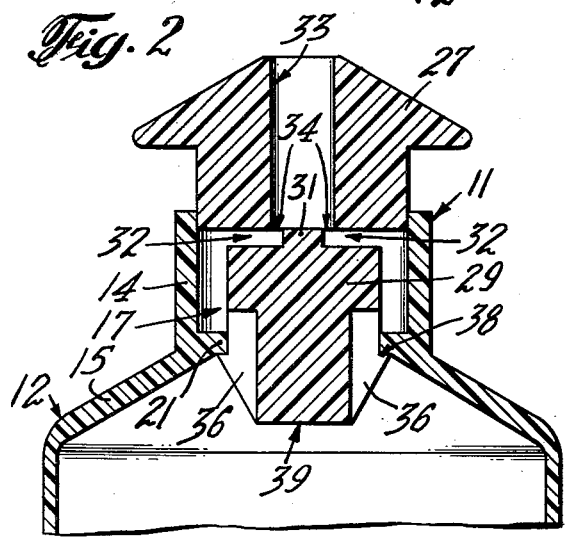
Fig. 2
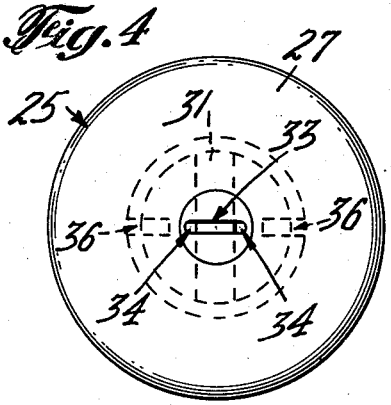
Fig. 4
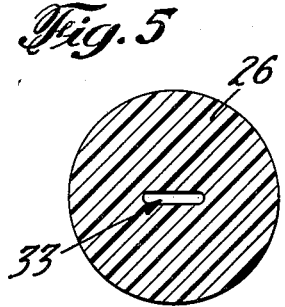
Fig. 5
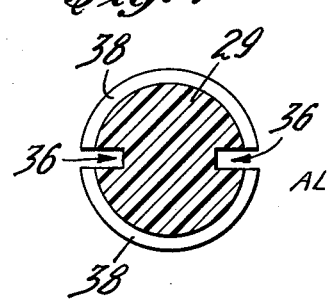
Fig. 7
Fig. 6
INVENTOR.
ALEXANDER GEORGE MAKOWSKI
BY Leland R. McCann
George W. Reiber
ATTORNEYS

United States Patent Office 3,107,829
Patented Oct. 22, 1963

3,107,829
DISPENSER FOR CONTAINERS
Alexander George Makowski, Fayville, Mass., assignor to American Can Company, New York, N.Y., a corporation of New Jersey
Filed Dec. 13, 1960, Ser. No. 75,524
3 Claims. (Cl. 222—525)

The present invention relates to a dispensing device for containers and has particular reference to a push-pull dispensing valve which permits of dispensing the contents of a container when the valve is in open position and seals the container against dispensing of its contents when the valve is in closed position.

An object of the instant invention is to provide a push-pull dispensing valve of simple construction which is economical to produce and which has a minimum number of parts which eliminates the use of sealing gaskets and the like and still is efficient in operation and easy to manipulate.

Another object is the provision of such a dispensing valve which can be entirely made of molded plastic parts which can be readily assembled and which insures of long use life.

Numerous other objects and advantages of the invention will be apparent as it is better understood from the following description, which, taken in connection with the accompanying drawings, discloses a preferred embodiment thereof.

Referring to the drawings:

FIGURE 1 is a sectional view of the dispensing end of a container equipped with a dispensing device embodying the instant invention, the view showing the dispensing device in closed position;

FIG. 2 is a sectional view similar to FIG. 1, the view showing the dispensing device in open position;

FIG. 3 is an elevational view of a valve plunger used in the dispensing device shown in FIGS. 1 and 2;

FIG. 4 is a top plan view of the valve plunger shown in FIG. 3, and

FIGS. 5, 6 and 7 are transverse sectional views taken substantially along the respective lines 5—5, 6—6, 7—7 in FIG. 3.

As a preferred and exemplary embodiment of the instant invention, the drawings illustrate a simple and novel dispensing device 11 which permits of dispensing the contents of a container 12 when the device is in open position as shown in FIG. 2 and which seals the container against dispensing its contents when the device is in closed position as shown in FIG. 1.

The dispensing device 11 is a simple device of two pieces preferably made of molded plastic material such as polyethylene and may be made as a separate unit to be attached to a container or may be made with the body piece as an integral part of the container as shown in the drawings.

The dispensing device 11 preferably comprises an upright cylindrical neck or valve body 14 (FIGS. 1 and 2) which may be formed as an integral part of a breast or frusto-conical top 15 of the container 12. In the drawings the container 12 is shown as a polyethylene collapsible tube such as used for toothpaste, shaving creams and the like products.

The neck or valve body 14 is formed with an axial discharge passage or chamber 17 which is open at its top end and which is defined by a cylindrical sealing seat wall 18 of the valve body. At its lower end, adjacent the top of the container, the valve body 14 is formed with a transverse web or bottom wall 21. This bottom wall 21 is formed with a cylindrical sealing seat 22 which surrounds and defines a discharge opening 23 in the bottom wall 21 and which preferably constitutes a part of the discharge passage 17.

A push-pull valve plunger 25 (FIG. 3) is slidably disposed in the neck or valve body 14 as shown in FIGS. 1 and 2. This valve plunger 25 preferably is cylindrical in formation and is formed with an upper first portion or part 26 having an outside diameter of substantially the same size as the inside diameter of the sealing seat wall 18 for sliding fit within the discharge passage 17 while at the same time providing a seal with the sealing seat wall 18 against the passage of a product. The outer or top end of the first portion 26 of the valve body is enlarged to provide a head 27 which extends beyond the neck or valve body 14 and normally rests on top of the body 14 when the plunger 25 is in closed position as shown in FIG. 1.

The lower or inner end of the valve plunger 25 is formed with a lower second portion or part 29 having an outside diameter of substantially the same size as the inside diameter of the sealing seat 22 in the discharge opening 23. This second portion 29 is disposed in and is slidable in the discharge opening 23 and at the same time seals the opening against the passage of a product when the plunger 25 is in closed position as shown in FIG. 1.

The first portion 26 and the second portion 29 of the valve plunger 25 are formed integral with each other and preferably are connected by a rectangular bar section 31 (FIGS. 1, 2, 3 4 and 6) which provides clearance spaces 32 between the portions and at both sides of the bar section.

The first and second portions 26, 29 of the valve plunger 25 are provided with discontinuous product passages for communication with the discharge passage 17 to permit of dispensing of the container contents when the valve plunger 25 is in open position as shown in FIG. 2. For this purpose the first or upper portion 26 of the valve plunger preferably is provided with a flat or elongated oval dispensing passage 33 (FIGS. 1, 2, 3, 4 and 5) which is axially disposed in the plunger and extends entirely through the first portion 26 from top to bottom. This passage 33 is open at the top or outer end and is contiguous with the connecting bar section 31 at its lower end, forming a pair of ports 34, one on each side of the bar section 31, which communicate with the adjacent clearance spaces 32.

In the lower or second portion 29 of the valve plunger 25 there is provided a pair of diametrically opposed, substantially vertical grooves or discontinuous passages 36 (FIGS. 1, 2, 3, 4, 6, 7) which are disposed in the outer face of the second portion 29 and which extend from the bottom or inner end of the portion 29 to a terminal point just below and adjacent the inner face of the transverse or bottom wall 21 of the valve body or neck 14, when the plunger 25 is in closed position as shown in FIG. 1.

Thus when the plunger 25 is in closed position, as when the head 27 of the plunger is engaging against the top edge of the neck, or valve body 14, as shown in FIG. 1, the discontinuous passages 36 in the second portion 29 of the plunger are disposed entirely inside the container and the discharge opening 23 is entirely closed and sealed against the passage of the contents of the container.

When it is desired to dispense the product contained within the container, it is merely necessary to pull the plunger 25 upwardly by grasping its head 27, into the open position shown in FIG. 2. An outwardly projecting shoulder 38 on the outer face of the second portion 29 is provided as a stop to engage under the bottom wall 21 of the valve body 14 to retain the plunger within the valve body and to locate the plunger in its fully open position.

In the fully open position of the plunger 25 as shown in FIG. 2, the upper discontinuous ends of the passages 36 in the second portion 29 are above the top of the body bottom wall 21 and therefore are in communication with the discharge passage 17. Hence there is thus established an open path of travel from the interior of the container through the passages 36, the discharge passage 17, the ports 34 and the dispensing passage 33 to the outside of the container for the free dispensing of the product from the container. In other words the pulling of the plunger 25 into open position in the valve body 14, establishes communication between the ends of the discontinuous passages 33, 36 in the plunger and the discharge passage 17 in the valve body and thereby produces a continuous open passage through the valve for the dispensing of the container product.

A resealing of the container is effected by pushing the valve plunger 25 back into its original position to disconnect the ends of the discontinuous passages in the plunger, as shown in FIG. 1. The discharge opening 23 in the body bottom wall 21 is thus sealed and the product remaining in the discharge passage 17 is sealed therein against leakage by the seal between the outer face of the plunger first portion 26 and the cylindrical sealing seat wall 18 of the valve body.

In order to provide for easy assembly of the plunger 25 with the valve body or neck 14, the inner or lower end of the plunger preferably is provided with an inwardly tapered nose 39 directly under the stop shoulder 38. Thus the plunger 25 may be readily pushed into place through the open top end of the discharge passage 17 and the discharge opening 23 in the valve body. When the shoulder 38 is pushed through the discharge opening 23, the plunger is fully assembled and held captive against displacement from the valve body.

It is thought that the invention and many of its attendant advantages will be understood from the foregoing description, and it will be apparent that various changes may be made in the form, construction and arrangement of the parts without departing from the spirit and scope of the invention or sacrificing all of its material advantages the form hereinbefore described being merely a preferred embodiment thereof.

I claim:

1. A dispenser for a container, comprising a body having an annular upstanding wall defining a chamber and an integral bottom flange projecting radially inwardly of said wall, the inner edge of said flange defining an aperture adapted to provide communication between the interior of said container and said chamber, and a two-part plunger slidably mounted in said body, said plunger including an upper part slidably movable within said chamber in constant intimate sealing contact with the upper region of said wall and a lower part movable in said aperture in sliding contact with said edge of said flange, said upper part having a dispensing passage in constant communication with said chamber, said lower part having an end portion provided with a flow passage in constant communication with the interior of said container, and a portion intermediate said end portion and said upper part, said intermediate portion having an imperforate outer surface and adapted to make intimate sealing contact with the edge of said flange to close said aperture, said plunger being movable to an open position whereat said imperforate portion of said lower part is withdrawn from said aperture and said passage in said end portion is moved into communication with said chamber to permit material flow from the interior of said container into said chamber and out through said dispensing passage, said plunger also being movable to a closed position whereat said imperforate portion blocks said aperture and said passage in said end portion is moved out of communication with said chamber.

2. A dispenser as defined in claim 1 further characterized by motion-limiting means on said plunger engageable against said bottom flange when said plunger is in its open position and against said annular upstanding wall when said plunger is in its closed position.

3. A dispenser as defined in claim 1 but further characterized by radial passages in said plunger between said upper and lower parts connecting said dispensing passage with said chamber in constant communication.

References Cited in the file of this patent
UNITED STATES PATENTS

| 2,695,119 | Kishpaugh et al. | Nov. 23, 1954 |
| 2,780,398 | Frey | Feb. 5, 1957 |
| 2,901,153 | Collins | Aug. 25, 1959 |
| 2,969,168 | Newby | Jan. 24, 1961 |